United States Patent
Fang

(10) Patent No.: US 9,715,624 B1
(45) Date of Patent: Jul. 25, 2017

(54) DOCUMENT IMAGE SEGMENTATION BASED ON PIXEL CLASSIFICATION

(71) Applicant: KONICA MINOLTA LABORATORY U.S.A., INC., San Mateo, CA (US)

(72) Inventor: Gang Fang, San Bruno, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 15/084,353

(22) Filed: Mar. 29, 2016

(51) Int. Cl.
| | |
|---|---|
| G06K 9/62 | (2006.01) |
| G06K 15/00 | (2006.01) |
| H04N 1/38 | (2006.01) |
| G06K 9/00 | (2006.01) |
| G06T 7/00 | (2017.01) |
| G06T 7/60 | (2017.01) |
| G06K 9/52 | (2006.01) |

(52) U.S. Cl.
CPC ........... *G06K 9/00449* (2013.01); *G06K 9/52* (2013.01); *G06K 9/6267* (2013.01); *G06T 7/0042* (2013.01); *G06T 7/0079* (2013.01); *G06T 7/60* (2013.01); *G06T 2207/20021* (2013.01); *G06T 2207/20144* (2013.01)

(58) Field of Classification Search
CPC .... G06K 9/00449; G06K 9/6267; G06K 9/52; G06K 9/38; G06T 7/60; G06T 2207/20021; G06T 7/0081; G06T 7/0083; G06T 2207/20144; G06T 2207/10016; G06T 7/10; G06T 7/73; G06T 7/194
USPC ....... 382/100, 128, 173, 176, 155, 159, 156, 382/232, 181, 190, 195, 199, 236, 224, 382/239, 180, 233, 228, 238, 254, 270, 382/235; 358/448, 462, 464, 3.01, 1.9, 358/3.06
See application file for complete search history.

(56) References Cited

U.S. PATENT DOCUMENTS

| | | | | |
|---|---|---|---|---|
| 5,956,468 | A * | 9/1999 | Ancin | G06K 9/38 358/1.9 |
| 6,389,164 | B2 * | 5/2002 | Li | G06T 5/20 358/462 |
| 6,473,522 | B1 * | 10/2002 | Lienhart | G06K 9/325 382/164 |
| 6,973,213 | B2 * | 12/2005 | Fan | G06T 7/187 382/176 |
| 7,043,078 | B2 * | 5/2006 | Guleryuz | G06K 9/00456 358/3.01 |

(Continued)

*Primary Examiner* — Sheela C Chawan
(74) *Attorney, Agent, or Firm* — Chen Yoshimura LLP

(57) ABSTRACT

In a document image segmentation method, pixels of the image are classified into different types such as background, text, table, etc., to generate an initial segmentation map. The initial segmentation map is processed multiple rounds. In each round, a working map is divided into 2×2 pixel blocks; based on pixel types in the block, a corresponding pixel in a combined map is assigned a type, and pixels in a corresponding block in the segmentation map are modified either to change some background pixels to other types or keep them unchanged. The initial segmentation map is used as the working map in the first round, and the combined map of the last round is used as the working map for the next round. After a number of rounds, remaining background pixels of the segmentation map are changed to other types based on the types of their neighboring areas.

14 Claims, 10 Drawing Sheets

(56) References Cited

U.S. PATENT DOCUMENTS

| | | | |
|---|---|---|---|
| 7,991,224 B2* | 8/2011 | Andrew | G06K 9/00456 382/164 |
| 8,417,033 B2* | 4/2013 | Fan | G06K 9/342 382/173 |
| 8,947,736 B2* | 2/2015 | Yu | H04N 1/40062 358/1.11 |
| 2003/0072487 A1 | 4/2003 | Fan et al. | |

* cited by examiner

| a00 | a01 | a02 | a03 | ... | ... |
|-----|-----|-----|-----|-----|-----|
| a10 | a11 | a12 | a13 |     |     |
| a20 | a21 | a22 | a23 |     |     |
| a30 | a31 | a32 | a33 |     |     |
| ... |     |     |     |     |     |
| ... |     |     |     |     |     |

Fig. 4

| a00 | a02 | ... | ... |
|-----|-----|-----|-----|
| a20 | a22 |     |     |
| ... |     |     |     |
| ... |     |     |     |

Fig. 4A

| a10 | a12 | ... | ... |
|-----|-----|-----|-----|
| a30 | a32 |     |     |
| ... |     |     |     |
| ... |     |     |     |

Fig. 4B

| a01 | a03 | ... | ... |
|-----|-----|-----|-----|
| a21 | a23 |     |     |
| ... |     |     |     |
| ... |     |     |     |

Fig. 4C

| a11 | a13 | ... | ... |
|-----|-----|-----|-----|
| a31 | a33 |     |     |
| ... |     |     |     |
| ... |     |     |     |

Fig. 4D

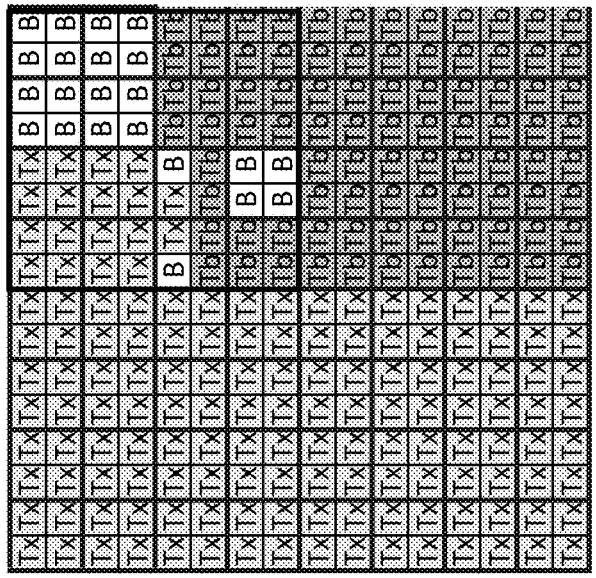
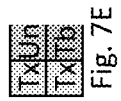
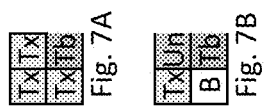
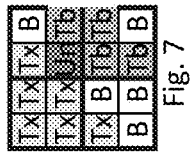

DOCUMENT IMAGE SEGMENTATION BASED ON PIXEL CLASSIFICATION

BACKGROUND OF THE INVENTION

Field of the Invention

This invention relates to an image processing method for document images, and in particular, it relates to a method for segmenting a document image based on pixels of 2D objects in the image.

Description of Related Art

A "document image" refers to a digital image representing a document which includes a substantial amount of text. For example, a document image may be generated by scanning a hard copy document, taking a photograph of a hard copy document, converting a text-based electronic document (e.g. a Word document) into an image format (e.g. PDF™), etc. Document image processing refers to various processing conducted for document images. One example of document image processing is optical character recognition (OCR), which aims to extract the textual content of the document. Another example of document image processing is document authentication, which aims to determine whether a target document image is the same as an original document image or whether it has been altered.

One step in document image processing is image segmentation, i.e. segmenting the document image into image segments that contain different types of contents, each segment containing only one type of content, such as text, tables, graphics, images, etc. Text may be further segmented into blocks of text such as paragraphs, etc. Many image segmentation methods have been described. For example, U.S. Pat. Appl. Pub. No. US 2003/0072487 describes a method for segmenting an image using the background. A low pass filter is applied on the image, and then the image is processed at low resolution by low resolution segmentation. Segmentation includes identification of the objects and the main background. This method can only be used to segment embedded images from text based on their different frequencies.

Some image segmentation methods first classify 2D objects in the document image into different types such as text, graphics, image, etc., and then segment the image based on the types of the objects. The processing of the second step is often complex and time-consuming.

SUMMARY

Accordingly, the present invention is directed to a method and related apparatus for document image segmentation that substantially obviates one or more of the problems due to limitations and disadvantages of the related art.

An object of the present invention is to provide an accurate and high-speed document image segmentation method.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a data processing apparatus for segmenting a document image containing a plurality of types of contents into multiple image segments, each image segment containing only one type of content, which includes: (a) initializing a segmentation map having a size identical to that of the document image, by classifying each pixel of the document image into one of a plurality of pixel types based on content of the document image and assigning each pixel of the segmentation map a pixel type identical to the pixel type of the corresponding pixel of the document image, wherein the plurality of pixel types include at least a background pixel type, a first pixel type, and a second pixel type; (b) defining a working map, the working map being identical to the segmentation map as initialized in step (a); (c) for each of a plurality of pixel blocks in the working map, evaluating the pixels in the block, and based on the evaluation, assigning a pixel value to a pixel of a combined map corresponding to the block of the working map and assigning pixel values to pixels of a pixel block of the segmentation map that corresponds to the pixel of the combined map, including: (c1) when the plurality of pixels in the block of the working map include only the background pixel type, assigning the background pixel type to the corresponding pixel of the combined map, and keeping the pixel type of each pixel in the corresponding block of the segmentation map unchanged, (c2) when the plurality of pixels in the block of the working map include only the first pixel type or include only the first pixel type and the background pixel type, assigning the first pixel type to the corresponding pixel of the combined map, and assigning the first pixel type to each pixel in the corresponding block of the segmentation map, (c3) when the plurality of pixels in the block of the working map include only the second pixel type or include only the second pixel type and the background pixel type, assigning the second pixel type to the corresponding pixel of the combined map, and assigning the second pixel type to each pixel in the corresponding block of the segmentation map, and (c4) when the plurality of pixels in the block of the working map include both the first pixel type and the second pixel type or include an unknown pixel type, assigning the unknown pixel type to the corresponding pixel of the combined map, and keeping the pixel type of each pixel in the corresponding block of the segmentation map unchanged, whereby the combined map is generated and the segmentation map is modified; (d) repeatedly performing step (c) a number of rounds, each round using the combined map obtained from the last round as the working map, wherein in each round that step (c) is performed, the combined map is smaller in size than in the last round and each pixel block of the segmentation map that corresponds to a pixel of the combined map is larger in size than in the last round; (e) after step (d), changing pixel types of any pixels of the segmentation map that have the background type to one of the other types of the plurality of pixel types; and (f) segmenting the document image into the multiple image segments based on the segmentation map obtained in step (e), wherein each image segment corresponds to an area in the segmentation map that has only one type of pixels.

In one embodiment, in step (c), each of the plurality of pixel blocks in the working map is a p by q pixel block, and in an n-th time that step (c) is performed, each pixel in the combined map corresponds to a $p^n$ by $q^n$ pixel block of the segmentation map.

In one embodiment, step (e) includes: grouping pixels in the segmentation map that have the background type into one or more contiguous groups; and for each contiguous group: examining neighboring pixels along an entire border of the contiguous group to determine a pixel type that is the most common among the neighboring pixels; and assigning the most common pixel type to all pixels of the contiguous group in the segmentation map.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIGS. 2A and 2B illustrate the overall flow of the method, and FIG. 3 illustrate the details of step S119 of FIG. 2B.

FIGS. 4-4D schematically illustrate a working map (FIG. 4) and four sub-maps (FIGS. 4A-4D) during a step of the document image segmentation method of FIGS. 2A-2B.

FIGS. 7-7F schematically illustrate various maps in another step of the document image segmentation method of FIGS. 2A-2B.

DETAILED DESCRIPTION OF PREFERRED EMBODIMENTS

Figure 1:
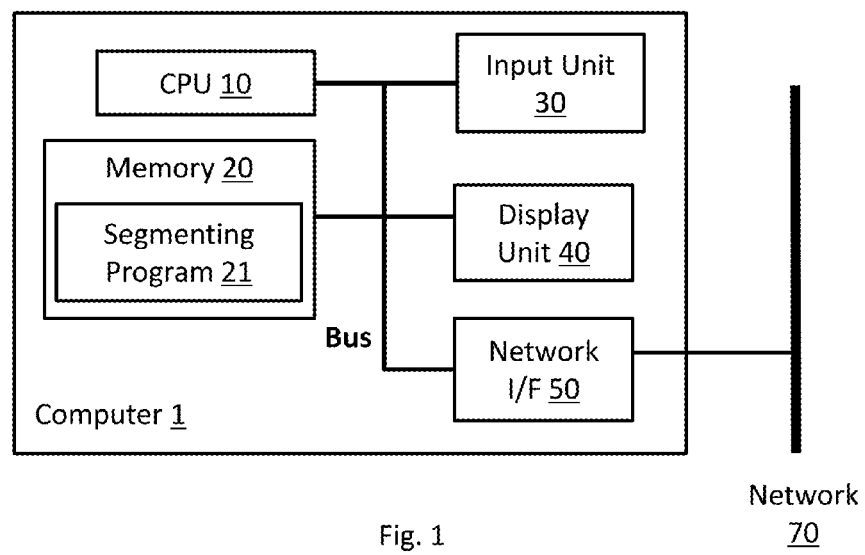
FIG. 1 is a system block diagram illustrating a computer system on which embodiments of the present invention may be implemented.

FIG. 1 is a system block diagram illustrating a computer system on which embodiments of the present invention may be implemented. The computer 1, which may be a server, personal computer, tablet or smart phone, includes a CPU 10, memory 20 storing computer programs such as a program 21 which carry out the document segmentation method according to embodiments of the present invention, an input unit 30, a display unit 40, and a network interface unit 50 connected to each other by a bus system. The computer 1 may be connected to a network.

The document image segmentation method includes two stages. The first stage is to classify each pixel of the document image into different types (i.e., to classify 2D objects in the image), including background, text, table, flowchart, other, etc. The second stage is to find the dividing lines between image segments after the classification of each pixel is done, to obtain segments that contain only one type of pixels. In other words, the resulting segments will be a text segment, a table segment, etc. Various methods are known for carrying out the first stage, which is not the focus of this invention. Embodiments of the present invention are directed to the second stage of the segmentation.

Figure 2A:
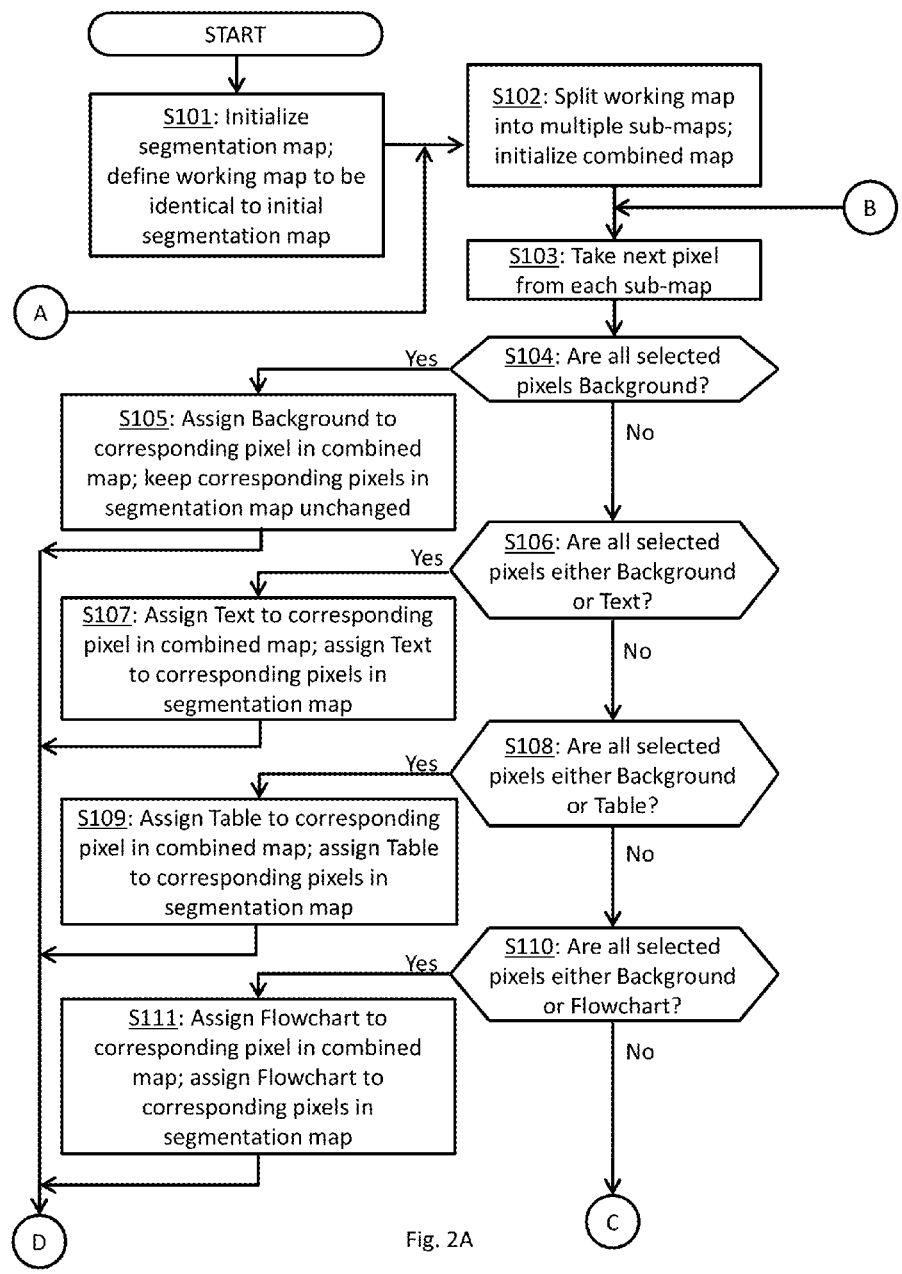
FIGS. 2A, 2B and 3 are flowcharts that illustrate a document image segmentation method according to an embodiment of the present invention.
Figure 2B:
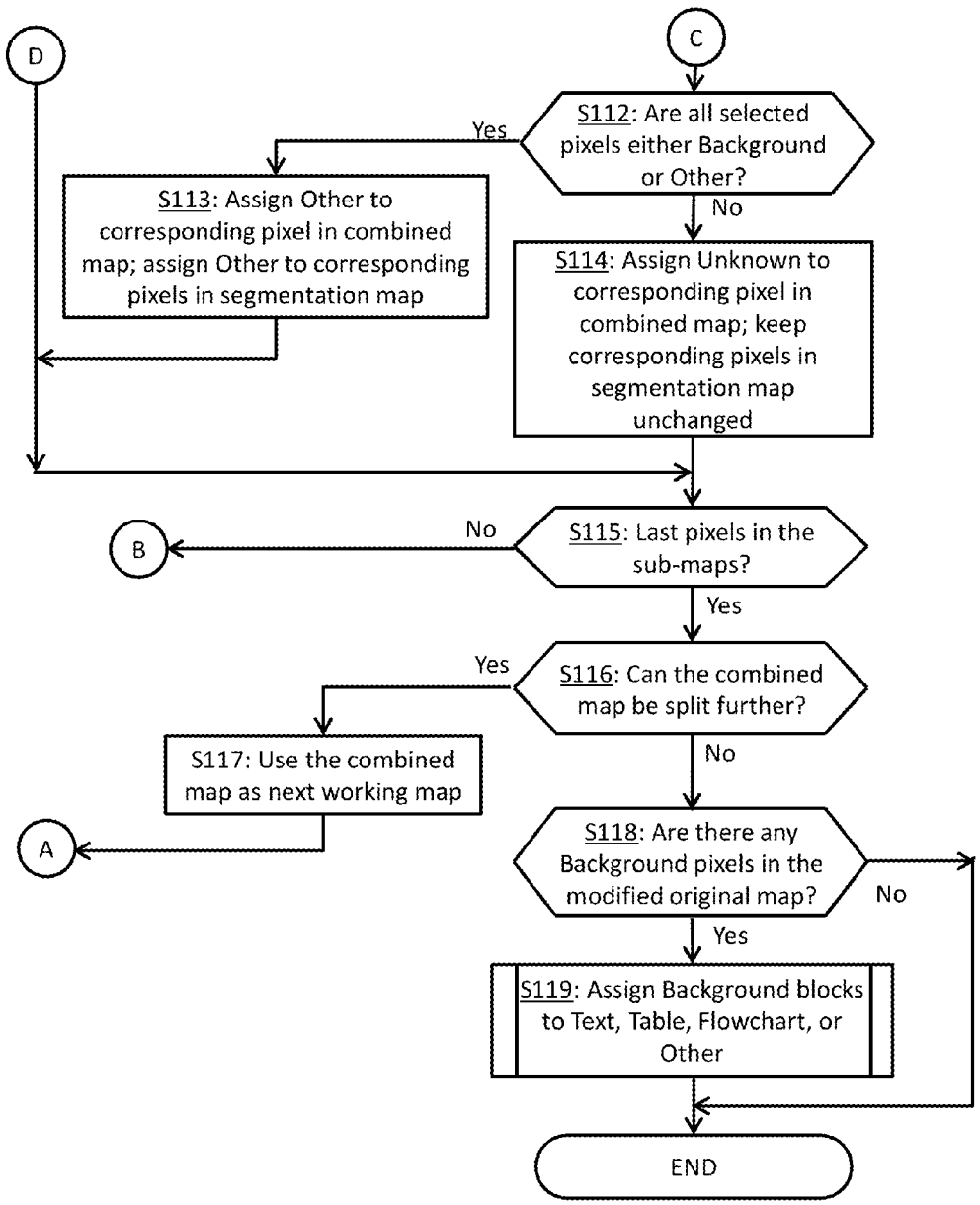
Figure 3:
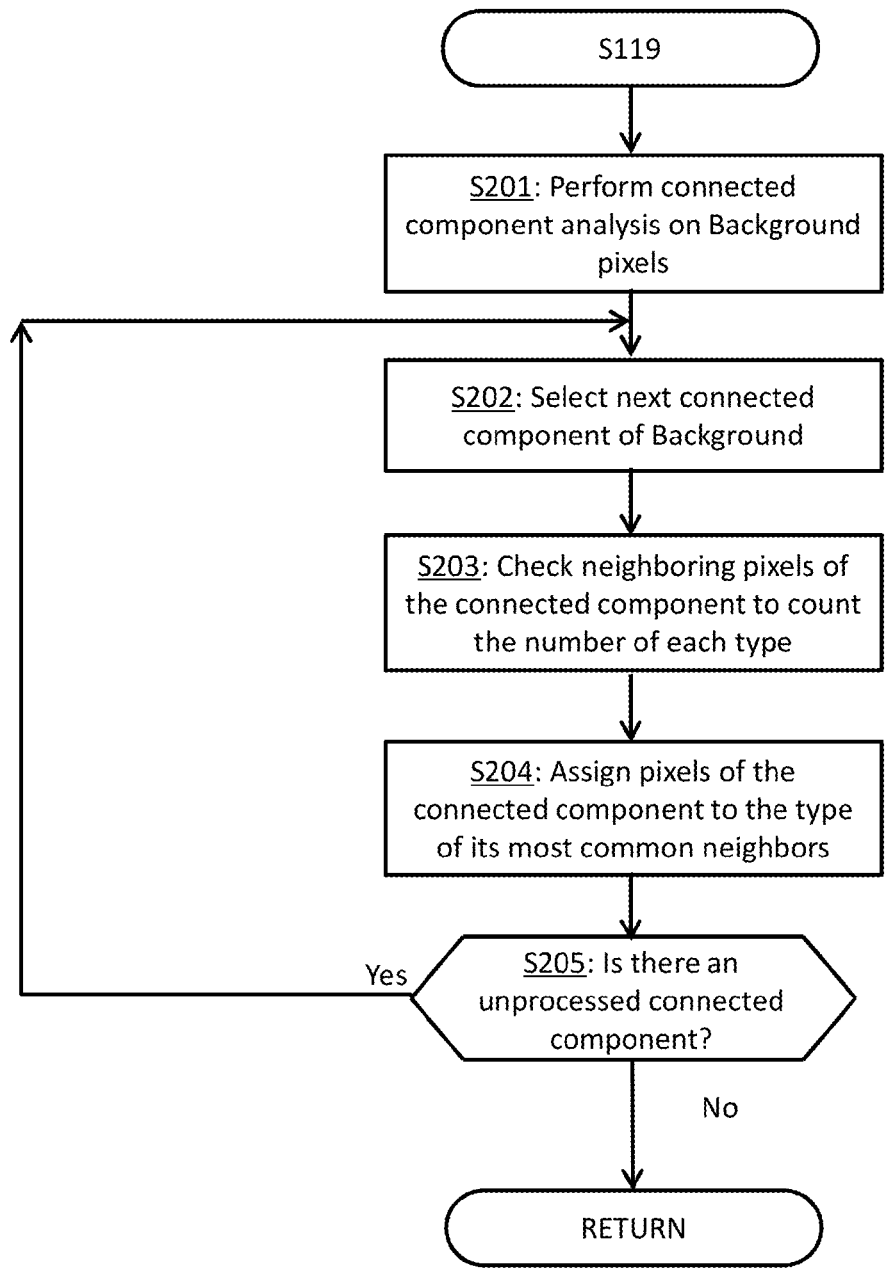

The process is describe below with reference to FIGS. 2A-7. FIGS. 2A, 2B and 3 are flowcharts that illustrate an image segmentation method according to an embodiment of the present invention. FIGS. 2A and 2B illustrate the overall flow of the method, and FIG. 3 illustrate the details of step S119 of FIG. 2B.

In step S101, a segmentation map is initialized. The segmentation map is a pixel map, having the same size as the document image being segmented, where each pixel has a value representing a pixel type. The segmentation map is initialized in step S101 and then modified in the subsequent steps. The segmentation map is initialized in step S101 based on the document image, so that the pixel type of each pixel in the initial segmentation map is the same as that of the corresponding pixel in the document image. As mentioned above, each pixel in the document image has already been classified into one of Background, Text, Table, Flowchart, or Other.

It should be noted although Background, Text, Table, Flowchart, and Other are used as examples of pixel types that the pixels of the document image may be classified into, other types may be used.

Also in step S101, a working map is set to be identical to the initial segmentation map.

In step S102, the working map is split into multiple sub-maps in an interspersed manner, so that different pixels in each contiguous block of the working map are distributed to different sub-maps.

In one embodiment, the working map is split into four sub-maps, and each pixel of a 2×2 block of the working map is distributed to one of the sub-maps. More specifically, in this embodiment, the working map is first divided into two maps, e.g., odd columns are put in one map and even columns are put in the other map. Each of the two maps is further divided into two maps, respectively, e.g., odd rows are put in one map and even rows are put in the other map. As a result, four sub-maps are obtained, and their widths and heights are one half of the width and height of the working map. The four pixels at the same position of the four sub-maps correctively correspond to a 2×2 block of the working map.

FIGS. 4-4D schematically illustrate a working map (FIG. 4) and the four resulting sub-maps (FIGS. 4A-4D), where each pixel is label by a label such as a00, a01, etc. to indicate how the working map is split.

In alternative embodiments, the working maps may be split into six (2×3 or 3×2) sub-maps, nine (3×3) sub-maps, or more generally, p by q sub-maps where p and q are natural numbers, etc. The descriptions below use the 2×2 split as an example.

Figure 5F:
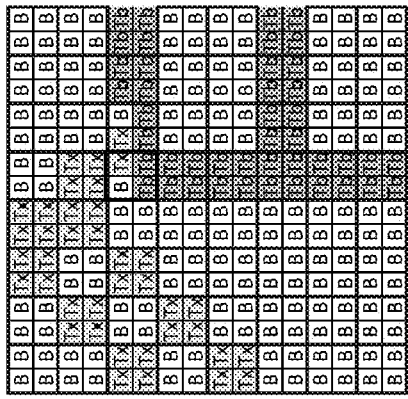
FIGS. 5-5F schematically illustrate various maps in a step of the document image segmentation method of FIGS. 2A-2B.
Figure 5E:
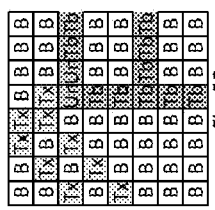
Figure 5A:
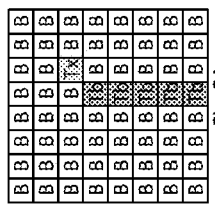
Figures 5B, 5C:
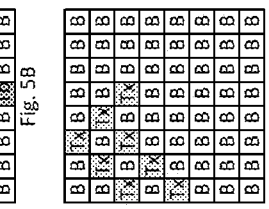
Figure 5D:
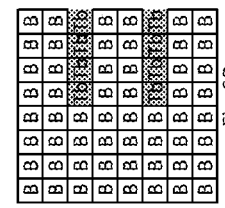
Figure 5:
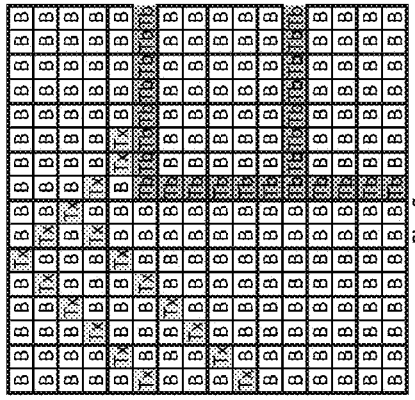

FIG. 5 schematically illustrates a part of an exemplary working map, where each pixel is labeled with the pixel type such as Background (B), Text (Tx), Table (Tb), etc. FIGS. 5A-5D illustrate the four resulting sub-maps obtained from the exemplary working map.

Also in step S102, a combined map having the same size as the sub-maps is initialized. At this time, each pixel of the combined map corresponds to a 2×2 block of the segmentation map.

In step S103, the next (first) pixel is taken from each of the four sub-maps. In steps S104, the four selected pixels are enumerate to determine whether all of them are Background pixels. If they are ("Yes" in S104), the corresponding pixel in the combined map is set to Background (in other words, the corresponding four pixels in the working map are merged as a Background pixel in the combined map), and the corresponding 2×2 pixels in the segmentation map are unchanged (step S105).

If in step S104 the four selected pixels are not all Background ("No" in S104), then in step S106, it is determined whether all of them are either Background or Text. If they are ("Yes" in S106), the corresponding pixel in the combined map is set to Text (in other words, the corresponding four pixels in the working map are merged as a Text pixel in the combined map), and the corresponding 2×2 pixels in the segmentation map are all set to Text (step S107).

Steps S108 and S109 are similar to steps S106 and S107 except that they check for whether all of the four selected pixels are either Background or Table and set the corresponding pixels in the combined map and segmentation map accordingly. Steps S110 and S111 are similar to steps S106 and S107 except that they check for whether all of the four selected pixels are either Background or Flowchart and set the corresponding pixels in the combined map and segmentation map accordingly. Steps S112 and S113 are similar to steps S106 and S107 except that they check for whether all of the four selected pixels are either Background or Other and set the corresponding pixels in the combined map and segmentation map accordingly.

If the determination is negative in step S112, it means that the selected four pixels include at least two of Text, Table, Flowchart and Other or they include one or more Unknown pixels. In this case, the corresponding pixel in the combined map is set to Unknown (in other words, the corresponding four pixels in the working map are merged as an Unknown pixel in the combined map), but the corresponding 2×2 pixels in the segmentation map are kept unchanged (step S114).

After steps S105, S107, S109, S111, S113 and S114, the process goes back to step S103 to process the next pixels from the four sub-maps, until all pixels of the sub-maps are processed ("Yes" in S115). As a result, the combined map is completed and the segmentation map is modified. This completes the first round of modification of the segmentation map.

FIG. 5E schematically illustrates the combined map generated from the exemplary working map shown in FIG. 5. FIG. 5F schematically illustrates the segmentation map after the modifications. As seen in this example, for the respective pixels of the first column and first row (starting from the upper-left corner) of the four sub-maps, all four pixels are Background, so the corresponding pixel in the combined map is Background, and the four corresponding pixels in the segmentation map are unchanged. For the respective pixels of the first column and third row of the four sub-maps, two are Background and two are Text, so the corresponding pixel in the combined map is Text, and the four corresponding pixels in the segmentation map are changed to Text. For the respective pixels of the fifth column and third row of the four sub-maps, one is Background, two are Table, and one is Text, so the corresponding pixel in the combined map is Unknown, and the four corresponding pixels in the segmentation map are unchanged (see the pixels in the thick-lined box in FIG. 5F).

After the first round (steps S102 to "No" in S115), the process determines whether the resulting combined map can be split further (step S116). If it can ("Yes" in S116), the combined map is used as the working map for the next round (step S117), and the process goes back to step S102 to split the working map, and to perform the process from step S103 to "No" in S115. This completes the second round of modification of the segmentation map.

In the second round, the segmentation map that has already been modified in the first round is further modified, but in the second round each pixel in the combined map corresponds to a 4×4 pixel block of the segmentation map and these 4×4 pixels are modified together (or left unchanged) in steps S105, S107, S109, S111, S113 and S114.

If after a given round, the resulting combined map can be further split ("Yes" step S116), then a further round is performed (step S117 and then step S102 to "No" in S115). In the n-th round, each pixel in the combined map corresponds to a $2^n \times 2^n$ block of the segmentation map and these $2^n \times 2^n$ pixels are modified together (or left unchanged).

The rounds are performed until the combined map obtained in a round cannot be further split into sub-maps ("No" in S116). A combined map cannot be further split when its size is, for example, smaller than 4×4 pixels. In an alternative embodiment, a predetermined number of rounds are performed.

Figure 6F:
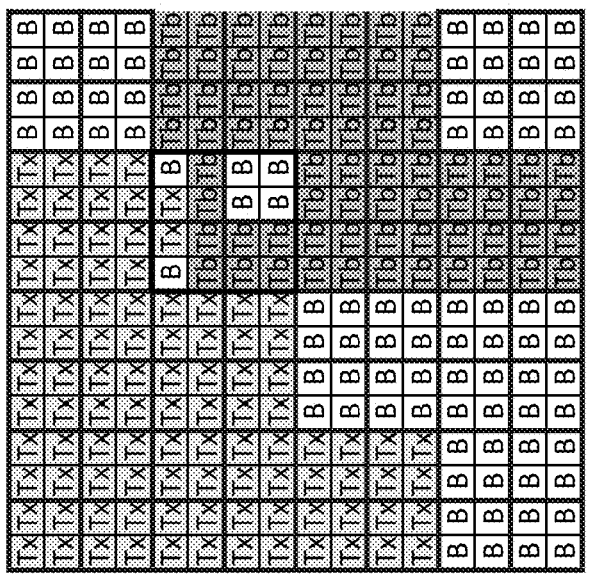
FIGS. 6-6F schematically illustrate various maps in another step of the document image segmentation method of FIGS. 2A-2B.
Figure 6E:
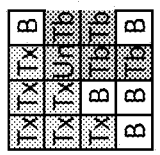
Figures 6A, 6B, 6C:
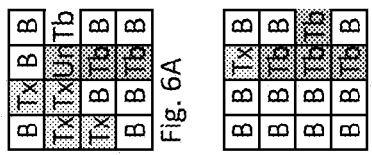
Figure 6D:
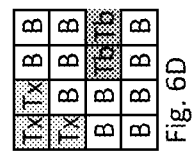
Figure 6:
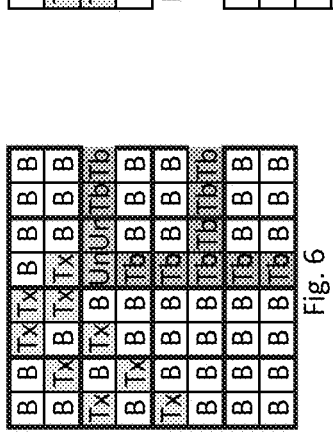

FIGS. 6-6E illustrate the various maps in the second round, using the same example as in FIGS. 5-5F. FIG. 6 illustrates the working map (which is the same as the combined map obtained in the first round, i.e. FIG. 5F); FIGS. 6A-6D illustrate the four resulting sub-maps after the second-round splitting; FIG. 6E illustrates the combined map generated by the second round; and FIG. 6F illustrates the segmentation map after modification by the second round. Each pixel in the combined map (FIG. 6E) corresponds to a 4×4 block in the segmentation map (FIG. 6F). It can be seen that, for example, the pixel in the first column and first row of the combined map is Text, and the pixels of the corresponding 4×4 block in the segmentation map are set to Text. The pixel in the third column and second row of the combined map is Unknown, and the pixels of the corresponding 4×4 block in the segmentation map (see pixels in the thick-lined box) are left unchanged from the segmentation map obtained by the previous round (compare FIG. 6F with FIG. 5F).

Similarly, FIGS. 7-7E illustrate the various maps for the third round. Each pixel in the combined map (FIG. 7E) corresponds to an 8×8 block in the segmentation map (FIG. 7F). It can be seen that, for example, the pixel in the first column and second row of the combined map (FIG. 7E) is Text, and the pixels of the corresponding 8×8 block in the segmentation map are changed to Text.

From the above description, it can be seen that for each round of processing, the effect is to divide the working map into multiple 2×2 blocks, where each 2×2 block corresponds to a pixel of the combined map; and the four pixels in each 2×2 block are examined to make the determinations in steps S106, S108, S110 and S112. Thus, while the four sub-maps are a convenient implementation of the method, they are not essential.

Stated more generally, in the n-th round, each p by q block of pixels in the working map corresponds to one pixel in the combined map and corresponds to a $p''$ by $q''$ block of the segmentation map. Steps S106, S108, S110 and S112 evaluate the p by q block of the working map, and steps S107, S109, S111, S113 and S114 assign pixel types to the corresponding one pixel in the combined map and the corresponding $p''$ by $q''$ block of the segmentation map. Even more broadly, the p by q block of the working map and the $p''$ by $q''$ block of the segmentation map may respectively be M-pixel blocks and $M''$-pixel blocks which are rectangular or non-rectangular.

When the combined map after a round cannot be further split ("No" in S116) or alternatively the predetermined number of rounds are completed, if there are any pixels in the segmentation map, after the rounds of modifications, that are still Background ("Yes" in step S118), step S119 is carried out to assign the remaining Background pixels to one of the other pixel types. More specifically, the remaining Background pixels are grouped into contiguous groups and the pixels in each group are set to the type of the most common neighbors of that block. FIG. 3 illustrates step S119 in more detail.

In step S201, a connected component analysis is carried out on the segmentation map for pixels that are Background to group these pixels into contiguous groups (referred to as connected components). For each connected component (step S202 and S205), the pixels that are neighbors with the connected component, i.e. those that touch the connected component along its border, are examined to count the number of neighboring pixels of each type along the entire border, to determine which pixel type is the most common (i.e. has the largest number among the neighboring pixels) (step S203). The pixels of that connected component are then changed to the type of its most common neighbors (step S204).

As a result of the process of FIGS. 2A, 2B and 3, after step S119, each pixel of the segmentation map is set to a type that is not Background. A contiguous block of pixels of one pixel type constitutes a segment of that type, and the entire segmentation map is thus segmented into one or more such segments. The segmentation map is used to segment the document image.

Figure 8:
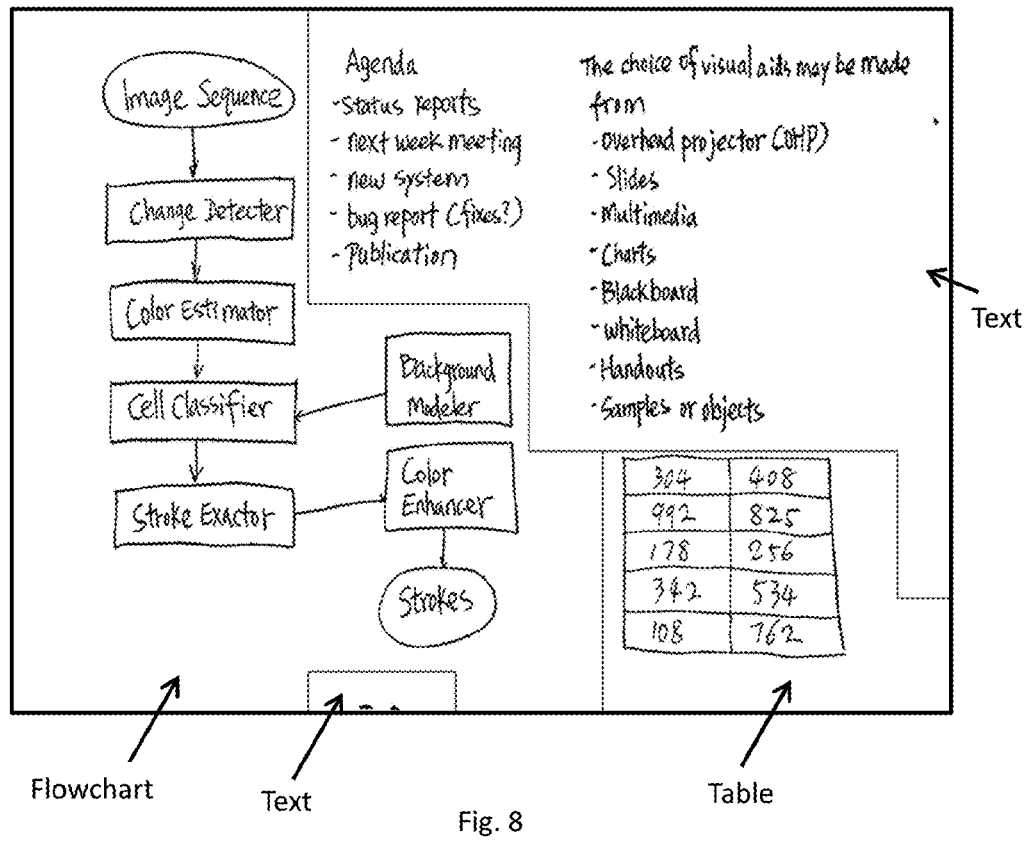
FIG. 8 shows a sample document image and its segmentation result.
Figure 9A:
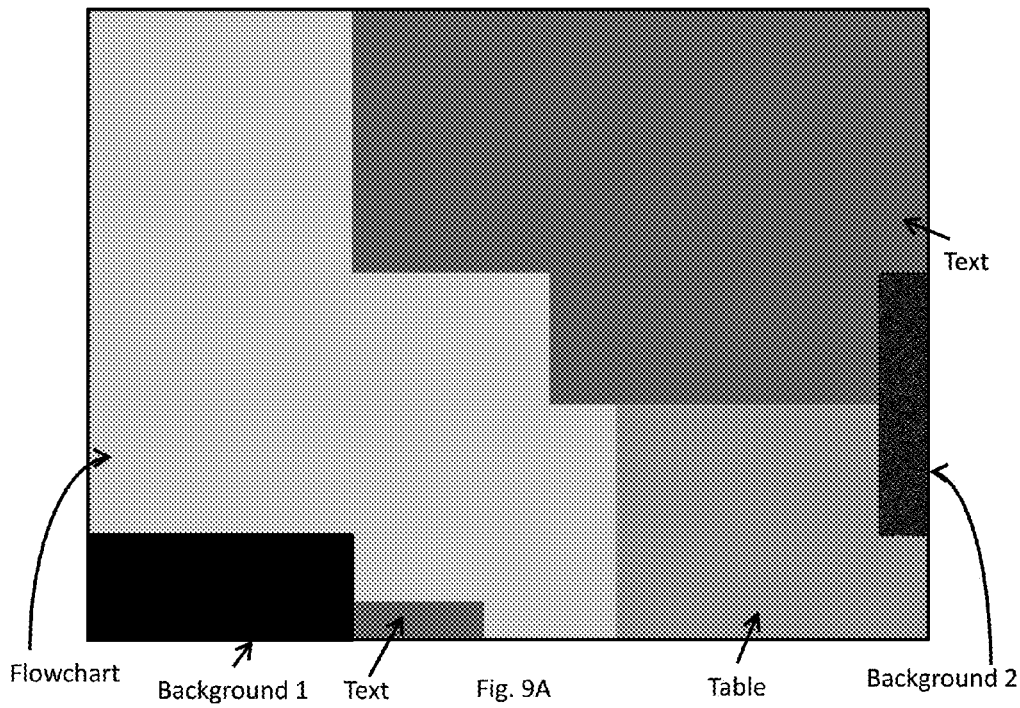
FIGS. 9A and 9B show pixel type assignment in the segmentation map of the example of FIG. 8 in two respective steps of the document image segmentation method of FIGS. 2A-2B.
Figure 9B:
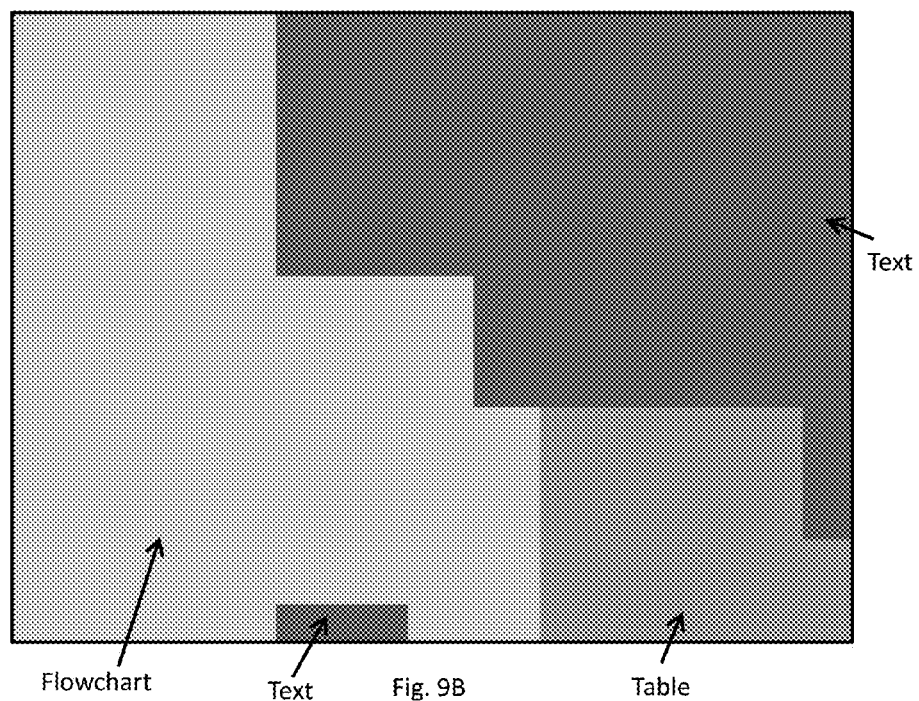

FIGS. 8 and 9A-9B show an example of image segmentation result. FIG. 8 shows a sample document image as well as its segmentation result as represented by the vertical and horizontal lines in the image. FIG. 9A shows the pixel type assignment in the segmentation map before step S119, where two areas of Background pixels remained. FIG. 9B shows the pixel type assignment in the final segmentation map after step S119, where the two background areas have been changed to Flowchart and Text, respectively. Each line that divide different image segments in the document image of FIG. 8 correspond to the border between two blocks of different types of pixels in the final segmentation map in FIG. 9B.

It will be apparent to those skilled in the art that various modification and variations can be made in the document image segmentation method and related apparatus of the present invention without departing from the spirit or scope of the invention. Thus, it is intended that the present invention cover modifications and variations that come within the scope of the appended claims and their equivalents.

What is claimed is:

1. A method implemented in a data processing apparatus for segmenting a document image containing a plurality of types of contents into multiple image segments, each image segment containing only one type of content, the method comprising:
    (a) initializing a segmentation map having a size identical to that of the document image, by classifying each pixel of the document image into one of a plurality of pixel types based on content of the document image and assigning each pixel of the segmentation map a pixel type identical to the pixel type of the corresponding pixel of the document image, wherein the plurality of pixel types include at least a background pixel type, a first pixel type, and a second pixel type;
    (b) defining a working map, the working map being identical to the segmentation map as initialized in step (a);
    (c) for each of a plurality of pixel blocks in the working map, evaluating the pixels in the block, and based on the evaluation, assigning a pixel value to a pixel of a combined map corresponding to the block of the working map and assigning pixel values to pixels of a pixel block of the segmentation map that corresponds to the pixel of the combined map, including:
        (c1) when the plurality of pixels in the block of the working map include only the background pixel type, assigning the background pixel type to the corresponding pixel of the combined map, and keeping the pixel type of each pixel in the corresponding block of the segmentation map unchanged,
        (c2) when the plurality of pixels in the block of the working map include only the first pixel type or include only the first pixel type and the background pixel type, assigning the first pixel type to the corresponding pixel of the combined map, and assigning the first pixel type to each pixel in the corresponding block of the segmentation map,
        (c3) when the plurality of pixels in the block of the working map include only the second pixel type or include only the second pixel type and the background pixel type, assigning the second pixel type to the corresponding pixel of the combined map, and assigning the second pixel type to each pixel in the corresponding block of the segmentation map, and
        (c4) when the plurality of pixels in the block of the working map include both the first pixel type and the second pixel type or include an unknown pixel type, assigning the unknown pixel type to the corresponding pixel of the combined map, and keeping the pixel type of each pixel in the corresponding block of the segmentation map unchanged,
    whereby the combined map is generated and the segmentation map is modified;
    (d) repeatedly performing step (c) a number of rounds, each round using the combined map obtained from the last round as the working map, wherein in each round that step (c) is performed, the combined map is smaller in size than in the last round and each pixel block of the segmentation map that corresponds to a pixel of the combined map is larger in size than in the last round;
    (e) after step (d), changing pixel types of any pixels of the segmentation map that have the background type to one of the other types of the plurality of pixel types; and
    (f) segmenting the document image into the multiple image segments based on the segmentation map obtained in step (e), wherein each image segment corresponds to an area in the segmentation map that has only one type of pixels.

2. The method of claim 1, wherein in step (c), each of the plurality of pixel blocks in the working map is a p by q pixel block, and
    wherein in an n-th time that step (c) is performed, each pixel in the combined map corresponds to a $p^n$ by $q^n$ pixel block of the segmentation map.

3. The method of claim 2, wherein step (c) includes generating p by q sub-maps from the working map, each sub-map being p by q times smaller than the working map, wherein each p by q block of pixels of the working map is distributed to the p by q sub-maps and are located at identical positions in the sub-maps, and
    wherein the step of evaluating the pixels in a pixel block of the working map includes evaluating the pixels located at the corresponding identical positions in the p by q sub-maps.

4. The method of claim 2, wherein step (c) is repeated until the combined map is incapable of being divided into a plurality of p by q pixel blocks.

5. The method of claim 2, wherein p=2 and q=2.

6. The method of claim 1, wherein step (e) comprises:
grouping pixels in the segmentation map that have the background type into one or more contiguous groups; and for each contiguous group:
examining neighboring pixels along an entire border of the contiguous group to determine a pixel type that is the most common among the neighboring pixels; and assigning the most common pixel type to all pixels of the contiguous group in the segmentation map.

7. The method of claim 1, wherein the first pixel type and the second pixel type include two pixel types selected form a group consisting of a text type, a table type, a flowchart type and an other type.

8. A computer program product comprising a computer usable non-transitory medium having a computer readable program code embedded therein for controlling a data processing apparatus, the computer readable program code configured to cause the data processing apparatus to execute a process for segmenting a document image containing a plurality of types of contents into multiple image segments, each image segment containing only one type of content, the process comprising:

(a) initializing a segmentation map having a size identical to that of the document image, by classifying each pixel of the document image into one of a plurality of pixel types based on content of the document image and assigning each pixel of the segmentation map a pixel type identical to the pixel type of the corresponding pixel of the document image, wherein the plurality of pixel types include at least a background pixel type, a first pixel type, and a second pixel type;

(b) defining a working map, the working map being identical to the segmentation map as initialized in step (a);

(c) for each of a plurality of pixel blocks in the working map, evaluating the pixels in the block, and based on the evaluation, assigning a pixel value to a pixel of a combined map corresponding to the block of the working map and assigning pixel values to pixels of a pixel block of the segmentation map that corresponds to the pixel of the combined map, including:

(c1) when the plurality of pixels in the block of the working map include only the background pixel type, assigning the background pixel type to the corresponding pixel of the combined map, and keeping the pixel type of each pixel in the corresponding block of the segmentation map unchanged, (c2) when the plurality of pixels in the block of the working map include only the first pixel type or include only the first pixel type and the background pixel type, assigning the first pixel type to the corresponding pixel of the combined map, and assigning the first pixel type to each pixel in the corresponding block of the segmentation map, (c3) when the plurality of pixels in the block of the working map include only the second pixel type or include only the second pixel type and the background pixel type, assigning the second pixel type to the corresponding pixel of the combined map, and assigning the second pixel type to each pixel in the corresponding block of the segmentation map, and (c4) when the plurality of pixels in the block of the working map include both the first pixel type and the second pixel type or include an unknown pixel type, assigning the unknown pixel type to the corresponding pixel of the combined map, and keeping the pixel type of each pixel in the corresponding block of the segmentation map unchanged, whereby the combined map is generated and the segmentation map is modified;

(d) repeatedly performing step (c) a number of rounds, each round using the combined map obtained from the last round as the working map, wherein in each round that step (c) is performed, the combined map is smaller in size than in the last round and each pixel block of the segmentation map that corresponds to a pixel of the combined map is larger in size than in the last round;

(e) after step (d), changing pixel types of any pixels of the segmentation map that have the background type to one of the other types of the plurality of pixel types; and (f) segmenting the document image into the multiple image segments based on the segmentation map obtained in step (e), wherein each image segment corresponds to an area in the segmentation map that has only one type of pixels.

9. The computer program product of claim 8, wherein in step (c), each of the plurality of pixel blocks in the working map is a p by q pixel block, and wherein in an n-th time that step (c) is performed, each pixel in the combined map corresponds to a $p^n$ by $q^n$ pixel block of the segmentation map.

10. The computer program product of claim 9, wherein step (c) includes generating p by q sub-maps from the working map, each sub-map being p by q times smaller than the working map, wherein each p by q block of pixels of the working map is distributed to the p by q sub-maps and are located at identical positions in the sub-maps, and wherein the step of evaluating the pixels in a pixel block of the working map includes evaluating the pixels located at the corresponding identical positions in the p by q sub-maps.

11. The computer program product of claim 9, wherein step (c) is repeated until the combined map is incapable of being divided into a plurality of p by q pixel blocks.

12. The computer program product of claim 9, wherein p=2 and q=2.

13. The computer program product of claim 8, wherein step (e) comprises:
grouping pixels in the segmentation map that have the background type into one or more contiguous groups; and for each contiguous group:
examining neighboring pixels along an entire border of the contiguous group to determine a pixel type that is the most common among the neighboring pixels; and assigning the most common pixel type to all pixels of the contiguous group in the segmentation map.

14. The computer program product of claim 8, wherein the first pixel type and the second pixel type include two pixel types selected form a group consisting of a text type, a table type, a flowchart type and an other type.

* * * * *